(12) United States Patent
George et al.

(10) Patent No.: US 10,193,964 B2
(45) Date of Patent: *Jan. 29, 2019

(54) CLUSTERING REQUESTS AND PRIORITIZING WORKMANAGER THREADS BASED ON RESOURCE PERFORMANCE AND/OR AVAILABILITY

(71) Applicant: International Business Machines Corporation, Armonk, NY (US)

(72) Inventors: Manu T. George, Bangalore (IN); Anoop G. M. Ramachandra, Mysore (IN); Murali K. Surampalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/270,398

(22) Filed: May 6, 2014

(65) Prior Publication Data

US 2015/0326499 A1  Nov. 12, 2015

(51) Int. Cl.
*H04L 12/64* (2006.01)
*H04L 29/08* (2006.01)
(Continued)

(52) U.S. Cl.
CPC ........ *H04L 67/1012* (2013.01); *G06F 9/5038* (2013.01); *H04L 12/6418* (2013.01);
(Continued)

(58) Field of Classification Search
CPC ................. G06F 9/5077; G06F 9/5011; G06F 2209/485; G06F 9/5027; G06F 12/0842; G06F 12/0808; G06F 9/5055; G06F 9/5083; H04L 41/509; H04L 43/08; H04L 41/0869; H04L 41/12; H04L 41/50; H04L 43/10; H04L 47/70; H04L 67/2842;
(Continued)

(56) References Cited

U.S. PATENT DOCUMENTS 7,603,719 B2  10/2009 Thomas et al.
7,676,581 B2   3/2010 Isaacs
(Continued)

OTHER PUBLICATIONS

Appendix P—List of IBM Patents or Patent Applications Treated as Related.
(Continued)

*Primary Examiner* — Ninos Donabed
(74) *Attorney, Agent, or Firm* — Gilbert Harmon, Jr.; David B. Woycechowsky

(57) ABSTRACT

In a system for providing data and/or computational services, various resources are assigned a sort of points (called vouchers or IOUs) for work manager threads that are currently queued at each resource. When a resource (and its associated resource manager) has a relatively small queue, whereby the resource is holding a relatively small number of points, that resource will be assigned work manager threads for incoming services requests at a high preference, or priority. In this way, faster performing resources can more reliably be supplied with new requests, while relatively slow performing resources will tend not to unduly tie up limited work manager threads in long queues at the slow resources.

9 Claims, 5 Drawing Sheets

(51) Int. Cl.
*H04L 12/911* (2013.01)
*G06F 9/50* (2006.01)

(52) U.S. Cl.
CPC .......... *H04L 47/783* (2013.01); *H04L 47/821* (2013.01); *H04L 47/827* (2013.01); *H04L 67/10* (2013.01)

(58) Field of Classification Search
CPC ............. H04L 41/5041; H04L 61/1511; H04L 65/403; H04L 65/60
See application file for complete search history.

(56) References Cited

U.S. PATENT DOCUMENTS

| | | | | |
|---|---|---|---|---|
| 8,214,653 | B1* | 7/2012 | Marr | G06F 21/572 380/286 |
| 8,649,760 | B2* | 2/2014 | Salkini | H04M 17/00 455/406 |
| 2006/0117319 | A1 | 6/2006 | Ayres et al. | |
| 2006/0190391 | A1* | 8/2006 | Cullen, III | G06Q 10/10 705/37 |
| 2008/0182553 | A1* | 7/2008 | Salkini | H04M 17/00 455/408 |
| 2008/0270313 | A1* | 10/2008 | Cullen | G06Q 10/06 705/80 |
| 2012/0054765 | A1* | 3/2012 | Lee | G06F 9/5027 718/104 |
| 2012/0102200 | A1 | 4/2012 | Rabii | |
| 2013/0097433 | A1* | 4/2013 | Boorman | G06F 1/3225 713/300 |
| 2013/0152097 | A1 | 6/2013 | Boctor et al. | |
| 2013/0325543 | A1* | 12/2013 | Magee | G06F 9/5016 705/7.25 |
| 2014/0129716 | A1* | 5/2014 | Garza | G06F 9/00 709/226 |
| 2014/0280703 | A1 | 9/2014 | Vaks | |
| 2014/0373021 | A1* | 12/2014 | Teixeira | G06F 9/5038 718/103 |
| 2015/0089062 | A1 | 3/2015 | Reiter | |
| 2015/0326494 | A1* | 11/2015 | George | H04L 47/827 709/226 |
| 2015/0326499 | A1* | 11/2015 | George | H04L 47/827 709/226 |

OTHER PUBLICATIONS

U.S. Appl. No. 14/554,235 entitled "Clustering Requests and Prioritizing Workmanager Threads Based on Resource Performance and/or Availability", filed Nov. 26, 2014.

Poellabauer et al., "Cooperative Run-time Management of Adaptive Applications and Distributed Resources", Multimedia '02, Dec. 1-6, 2002, Juan-les-Pins, France, pp. 402-411.

"The Proven Approach to Rapid Network Application Development", The Netty Project 3.1 User Guide, 3.1.5GA, r1772, pp. 1-22, as of Feb. 1, 2014.

* cited by examiner

CLUSTERING REQUESTS AND PRIORITIZING WORKMANAGER THREADS BASED ON RESOURCE PERFORMANCE AND/OR AVAILABILITY

BACKGROUND OF THE INVENTION

The present invention relates generally to the field of "work manager threads" (see definition, below, in Definitions sub-section of the Detailed Description section), and more particularly to managing multiple active work manager threads.

In application server environments, there are typically hundreds, or thousands, of concurrent users ("clients"). Each of these clients typically sends requests to the application server system. In order to handle all of the clients, a server computer typically has: (i) many resources (for example, processors, data storage devices); (ii) for each resource, a resource manager to manage the use of each resource in responding to these client requests; and (iii) work manager threads for communicating: (a) incoming client requests to the appropriate resource manager, and (b) request responses from each resource manager back toward the client who made the request. More specifically, the work manager threads: (i) take requests from the clients; (ii) apply the requests to the various resource managers of the server; and (iii) control and manage responses to the requests (for example, send applications, or results from running applications, back to the clients).

SUMMARY

According to an aspect of the present invention, there is a method, system and computer program product that performs the following steps (not necessarily in the following order): (i) dividing a set of vouchers into a plurality of voucher subsets so that each voucher sub-set respectively corresponds to a resource manager of a plurality of resource managers, where each resource manager of the plurality of resource managers respectively corresponds to a resource in an application server; (ii) receiving a plurality of incoming pending requests with each incoming pending request respectively corresponding to a resource; (iii) temporarily removing a voucher from its voucher subset corresponding to a given resource manager upon each instance that a given pending incoming request is assigned to that given resource manager for responsive processing such that the given pending incoming request thereby becomes an assigned request; and (iv) determining which request of the plurality of pending incoming requests will be next assigned to a corresponding resource manager based, at least in part, upon which resource manager has the greatest number of vouchers in its respective subset of vouchers.

DETAILED DESCRIPTION

Figure 1:
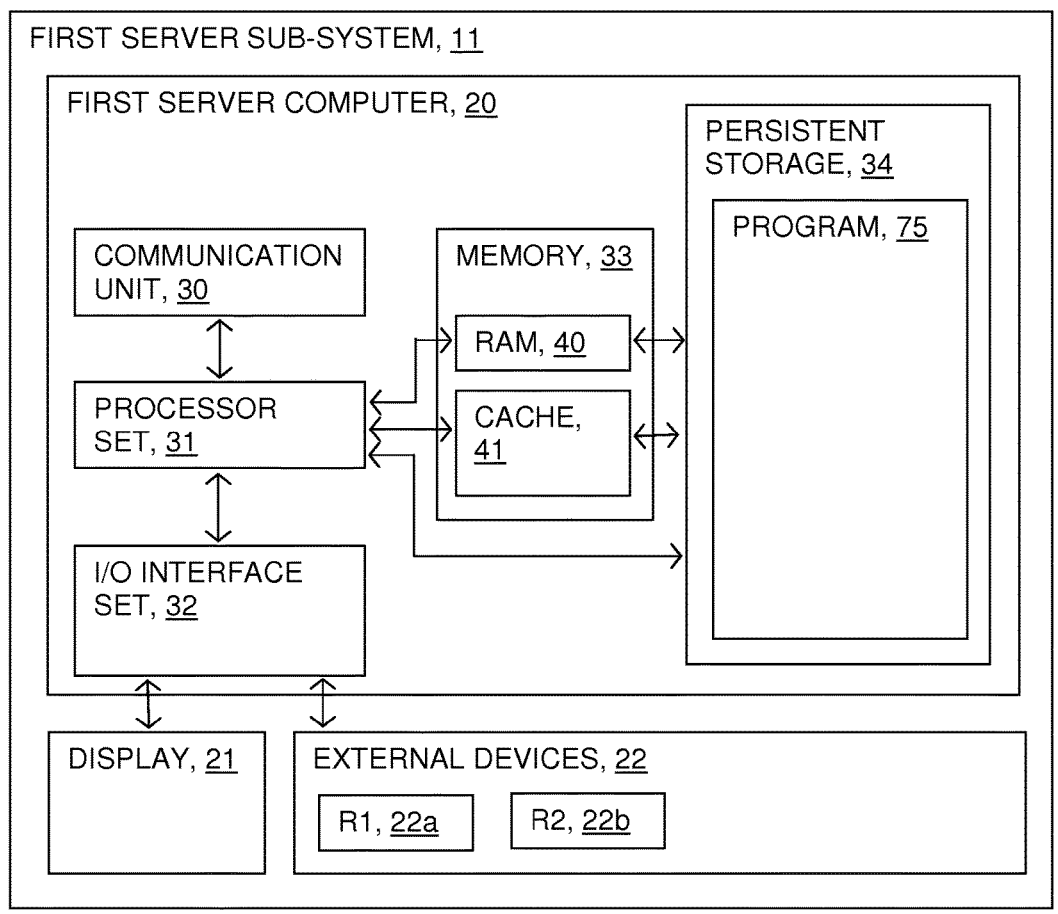
FIG. 1 is a schematic view of a first embodiment of a server computer system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of first server sub-system 11. First server sub-system 11 receives requests for resources from other remote computers (not shown) in a larger computer system of which server sub-system 11 is a constituent part. As will be appreciated by those of skill in the art, the requests may be received, and responded to, through a wide area and/or local area network (not shown) of any type now known or to be developed in the future. As shown in FIG. 1, sub-system 11 includes: first server computer 20; display device 21; and external devices 22 (including first resource 22a and second resource 22b). First server computer 20 includes: communication unit 30; processor(s) set 31; input/output (I/O) interface set 32; memory device 33; persistent storage device 34; random access memory (RAM) device 40; cache memory device 41; and program 75. Sub-system 11 is, in many respects, representative of the various computer sub-system(s) in the present invention. Accordingly, several portions of sub-system 11 will now be discussed in the following paragraphs.

Sub-system 11 may be a laptop computer, tablet computer, netbook computer, personal computer (PC), a desktop computer, a personal digital assistant (PDA), a smart phone, or any programmable electronic device capable of communicating with the client sub-systems via one or more network(s) (not separately shown). Program 75 is a collection of machine readable instructions and/or data that is used to create, manage and control certain software functions that will be discussed in detail, below, in the Example Embodiment sub-section of this Detailed Description section.

Sub-system 11 is capable of communicating with other computer sub-systems via a network (not separately shown). The network(s) can be, for example, a local area network (LAN), a wide area network (WAN) such as the Internet, or a combination of the two, and can include wired, wireless, or fiber optic connections. In general, the network(s) can be any combination of connections and protocols that will support communications between server and client sub-systems.

Sub-system 11 is shown as a block diagram with many double arrows. These double arrows (no separate reference numerals) represent a communications fabric, which provides communications between various components of sub-system 11. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

The memory and the persistent storage are computer-readable storage media. In general, memory 33 can include any suitable volatile or non-volatile computer-readable storage media.

Program 75 is stored in the persistent storage for access and/or execution by one or more of the processors of the processor(s) set, usually through one or more memories of memory device 33. Persistent storage 34: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 34.

Program 75 may include both machine readable and performable instructions and/or substantive data (that is, the type of data stored in a database). In this particular embodiment, persistent storage 34 includes a magnetic hard disk drive. To name some possible variations, persistent storage 34 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer-readable storage medium that is also part of persistent storage 34.

Communications unit 30, in these examples, provides for communications with other data processing systems or devices external to sub-system 11. In these examples, communications unit 30 includes one or more network interface cards. Communications unit 30 may provide communications through the use of either or both physical and wireless communications links. Any software modules discussed herein may be downloaded to a persistent storage device (such as persistent storage device 34) through a communications unit (such as communications unit 30).

I/O interface set 32 allows for input and output of data with other devices that may be connected locally in data communication with server computer 20. For example, I/O interface set 32 provides a connection to external device set 22.

External device set 22 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 75, can be stored on such portable computer-readable storage media. In these embodiments the relevant software may (or may not) be loaded, in whole or in part, onto persistent storage device 34 via I/O interface set 32. I/O interface set 32 also connects in data communication with display device 21. In this embodiment, external device set 22 includes a first resource 22a and a second resource 22b. Each resource 22a, 22b includes a resource manager (not separately shown), but the resource manager may not be wholly, or even partially, physically located in the resource that it respectively manages. In this example, the primary purpose of first server sub-system 11 is to serve the services of these two resources. These two resources may themselves include one or more computers, processors, memories and/or storage devices, as well as software and/or firmware. The Further Comments And/Or Embodiments sub-section of this Detailed Description section will discuss at least some of the types of resources that a server may serve.

Display device 21 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
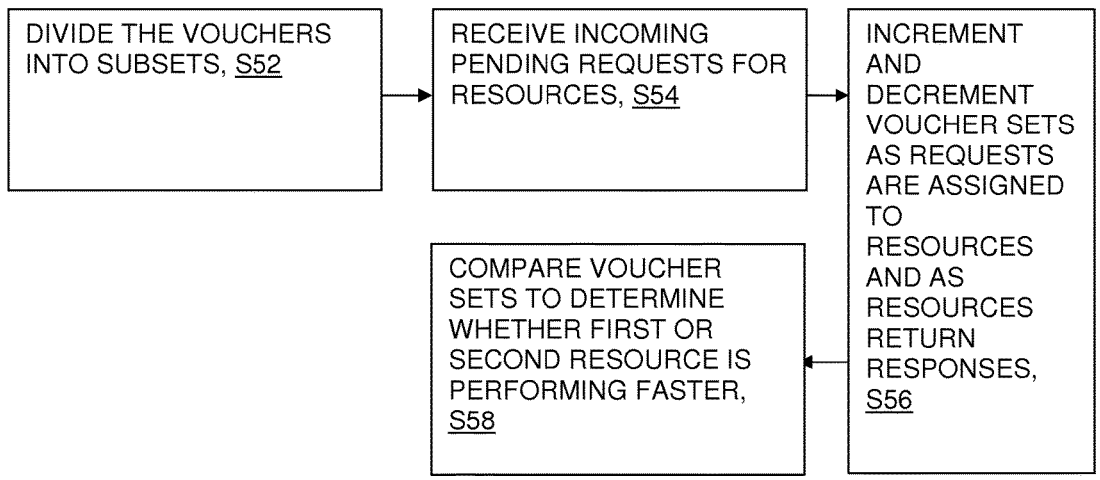
FIG. 2 is a flowchart showing a process performed, at least in part, by the first embodiment computer system.
Figure 3:
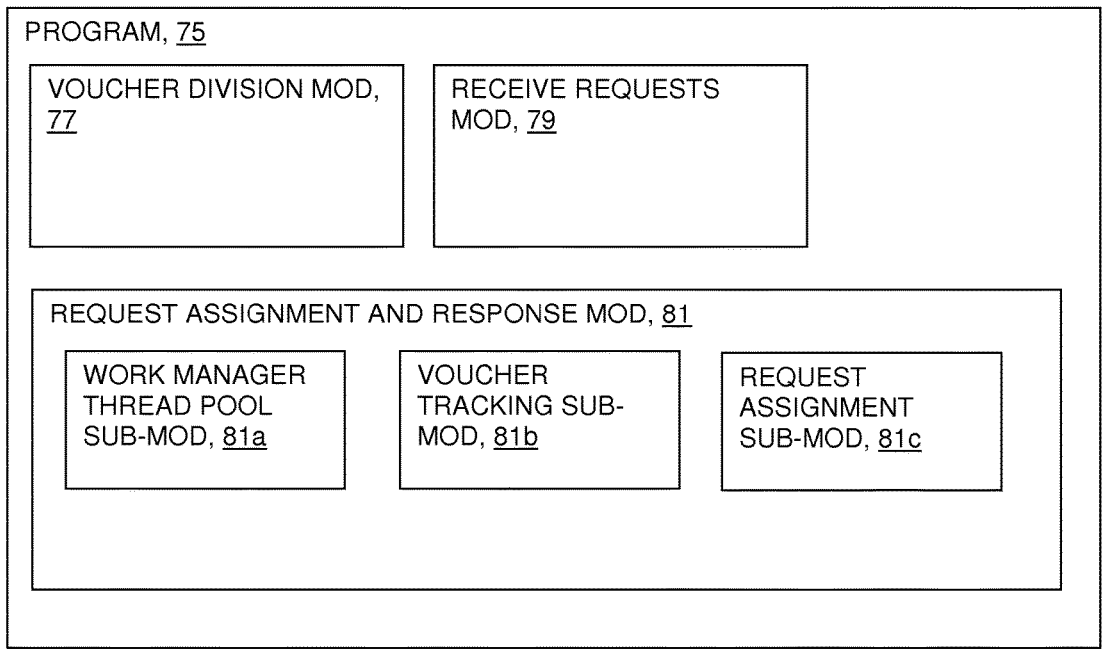
FIG. 3 is a schematic view of a software portion of the first embodiment computer system.

FIG. 2 shows flowchart 50 showing a method according to the present invention. FIG. 3 shows program 75 for performing at least some of the method steps of flowchart 50. This method and associated software will now be discussed, over the course of the following paragraphs, with extensive reference to FIG. 2 (for the method step blocks) and FIG. 3 (for the software blocks).

Processing begins at step S52, where voucher division module ("mod") 77 takes a set of vouchers and divides them into subsets respectively corresponding to the resources 22a, 22b (see FIG. 1). As mentioned above, in this example, references to resources should be taken to include the resource manager that respectively manages each resource. Each voucher subset represents the total number of vouchers that can be assigned to the corresponding resource, but, at step S52, before the start of normal operations, none of the vouchers of either subset (that is, the first resource subset and the second resource subset) has yet been assigned to the corresponding resource. In this example, the number of vouchers that is divided into subsets is equal to the number of work manager threads in work thread manager pool sub-mod 81a (see FIG. 3). In this example, the number of work threads manager is sixty (60). Further, in this example, the subsets are divided by mod 77 such that the ratio of the proportion of total vouchers in each subset reflects the proportion of incoming pending requests that are expected to be directed to the corresponding resource. In this example, two thirds of the requests are expected to be directed to first resource 22a, and one third of the requests are expected to be directed to second resource 22b, meaning that: (i) the subset of vouchers corresponding to the first resource is forty (40); and (ii) the subset of vouchers corresponding to the second resource is twenty (20).

Processing proceeds to step S54 where normal operations start, meaning that receive requests mod 79 receives pending incoming requests, with each pending incoming request being directed, in this example, to the first resource or the second resource. These pending incoming requests come to first server sub-system from other computers in the larger networked computer system of which server sub-system 11 forms a part. These pending incoming requests are accepted in the currently conventional manner in this embodiment, making extended discussion of this method step unnecessary.

Processing proceeds to Step S56 where request assignment and response mod 81: (i) converts the pending incoming requests into assigned requests by assigning them to a work manager thread for queuing at the respectively requested resource; (ii) decrements the appropriate voucher subset as each pending incoming request is converted to an assigned request; (iii) upon receiving a response from a resource, converts the assigned request into a completed request by removing the request from its previously assigned work manager thread; (iv) delivers the response of the completed request back to the requesting device (this part is conventional); and (v) increments the appropriate voucher subset as each assigned request is converted to a completed request. In performing these actions: (i) the work manager threads come from work manager thread pool sub-mod 81a;

(ii) the incrementing and decrementing of vouchers is performed by voucher tracking sub-mod 81b; and (iii) the requests are assigned work manager threads, and later "unassigned" work manager threads, by request assignment sub-mod 81c.

During the normal operations of step S56, if either resource is performing fast then it will tend to have a short queue of assigned requests, and will therefore tend to have, at any given time, relatively few vouchers temporarily decremented from its corresponding voucher subset. For similar reasons, if either resource is performing slowly then it will tend to have a long queue of assigned requests, and will therefore tend to have, at any given time, relatively numerous vouchers temporarily decremented from its corresponding voucher subset. The foregoing reasoning is what allows the number of vouchers remaining in a resource's voucher subset to be used as a sort of proxy for how fast the resource is performing. This can be useful information as will be seen, below, in the discussion of step S58.

Processing proceeds to step S58, which focuses on the assignment of a single work thread to a single pending incoming request. Step S58 is simply a part of the actions that take place numerous times as step S56 is ongoing, but, for purposes of understanding operation of this embodiment of the present invention, it is helpful to focus on a single assignment of a single pending incoming request to a work manager thread for queuing at the corresponding resource manager/resource. More specifically, request assignment sub-mod has many pending incoming requests, variously directed to both the first and second resources, to handle and assign at any given time. However, the machine logic of sub-mod 81c must determine which pending incoming request to next assign by assigning a work manager thread.

In this simple example, the choice is limited to the following alternatives: (i) the next assigned request will be the earliest received request directed to the first resource; or (ii) the next assigned request will be the earliest received request directed to the second resource. As between these two alternatives, sub-mod 81c will choose the request whose corresponding resource has the most vouchers left in its subset, and this is the request that will be converted from a pending incoming request into an assigned request by assigning a work manager thread from work manager thread pool sub-mod 81a. If there are no threads left in the thread pool, then the determination of which pending incoming request to assign, and the consequent assignment, will await the availability of a work manager thread that is returned to the pool by virtue of completion of a previously-assigned request.

Some variations will now be mentioned. Some embodiments of the present invention will have more (perhaps many more) than three resources. Also, some embodiments may consider, in determining which request to assign next, factors that go beyond: (i) when the request was received; and (ii) voucher subset numbers. For example, there may be a priority scheme associated with the requests that additionally takes into account other factors such as the identity of the requester.

III. Further Comments and/or Embodiments

Some embodiments of the present invention recognize that when an application has to access multiple "resource managers" (which will generally have a different level of performance relative to each other), the resources in the application server may become disproportionately consumed by relatively slow-performing resource manager(s) at the cost of faster performance which could have been realized if faster resource managers had been used. For example, an application, and its attendant service back to the client, might need to access multiple resource managers such as: (i) message provider resource manager; (ii) a first database resource manager for providing data for running the application; and (iii) a second database resource manager for serving application requests. In this example, all three of the resource managers will have varying degrees of response time depending on factors such as: (i) network speed to individual resource managers; (ii) load and capability of the resource managers; and (iii) system configuration hosting resource managers. The requests to relatively slow-performing resource manager(s) will generally take a longer period of time to receive a response. This becomes a limiting factor with the speed at which the client is served.

Some embodiments of the present invention recognize that these long response periods of slow performing resource managers effectively hold the VM (virtual machine) resources, such as work manager threads, "hostage." As a result, these resources will not be available to application requests interacting with better performing resources. For this reason, in a production environment, a work manager thread pool can get filled up quickly, and the pool will deny threads to requests, including threads that do not involve connecting to a slow resource manager (such as a slow database). Some embodiments of the present invention recognize that a single application module normally runs on a single VM and any performance problem with backend resource or network will render the thread pool as a sort of "hostage." This could also happen when there is a complex query that might take a long time to complete on a single database. Many requests that will not need database access will not be immediately allocated for service threads in the filled-up thread pool and these requests will wait as well.

Some embodiments of the present invention further recognize one, or more, of the following potential problems, shortcomings and/or opportunities for improvement with respect to the state of the art: (i) changing the connection pool settings to lower value will still have impact because threads will still be forced to wait as a consequence of the connection pool having a lower size; (ii) increasing the thread pool, or setting a control that allows growth, could hang the VM and cause an application outage; (iii) running the same application on the multiple VMs or clusters will also not usually be helpful because all requests eventually connect to the same slow resource managers and all VMs will face similar performance issues.

Some embodiments of the present invention may include one, or more, of the following features, characteristics and/or advantages: (i) clustering of work manager threads based on the resource that the work manager threads need to utilize; (ii) prioritizing of requests, while allocating work manager threads, based on performance of the resource the work needs to utilize; and/or (iii) clusters of work manager threads connecting to slow-performing resource are given lower priority at runtime based on successful completion of work relatively compared to the faster performing resources.

Figure 4:
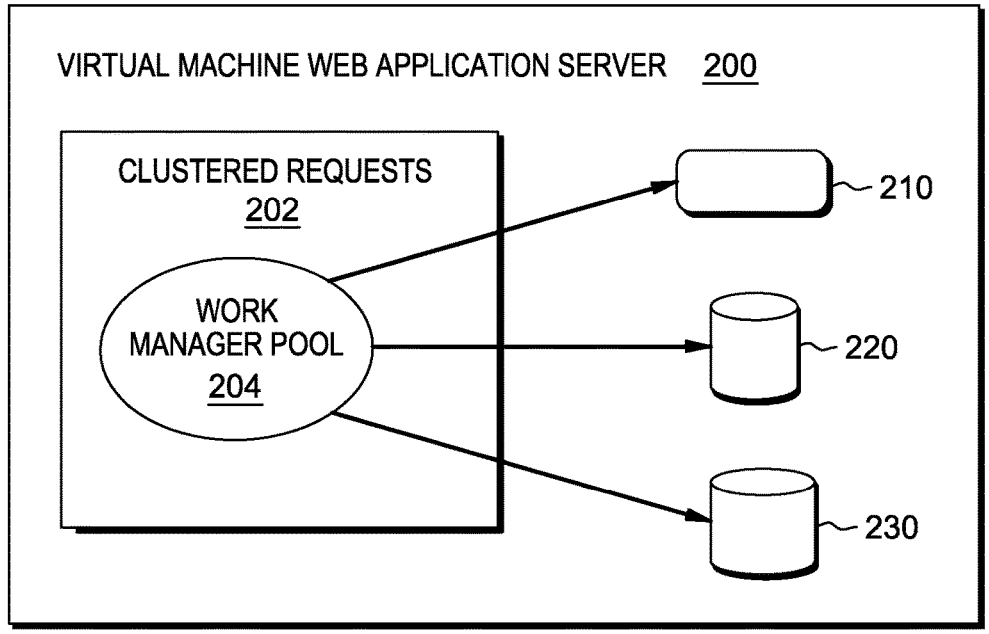
FIG. 4 is a schematic view of a second embodiment of a server computer system according to the present invention.
Figure 5:
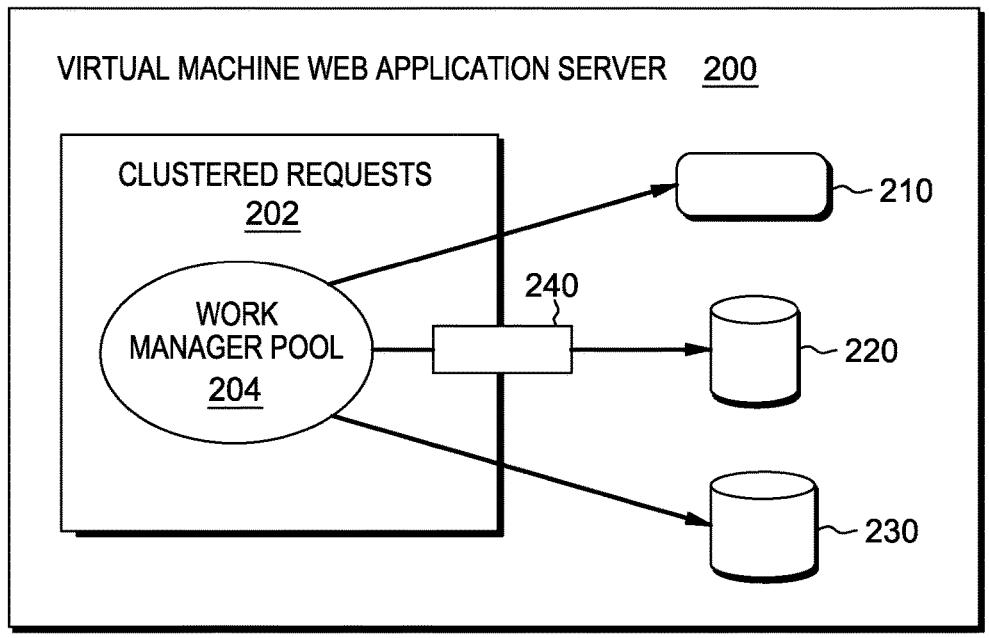
FIG. 5 is another schematic view of the second embodiment server computer system.

FIGS. 4 and 5 show virtual machine web application server system 200, including: clustered request set 202; work manager thread pool 204; message-oriented middleware resource 210; slow database resource 220; fast database resource 230; and delayed work manager thread requests 240. In this example, a web module "module1" of an application "app1" makes a request that involves connecting to multiple resources 210, 220, 230. In some situations, a particular request is likely to be responded to slowly due to network issues, firewall problems or a complex query. In these situations, a resource (for example, database) will typically take a few seconds to a few minutes to respond. These requests (herein sometimes referred to as work manager thread requests) will hold an associated work manager thread waiting until the slow resource (for example, the slow database) responds.

However, in system 200: (i) work manager threads of work manager thread pool 204 that require connection to a common, single resource are identified and grouped (or "clustered") in clustered requests set 200; (ii) each cluster is provided with a set of "I owe you" (IOU) tickets; (iii) every request to a resource 210, 220 or 230, from a cluster in cluster set 202, will utilize single IOU Ticket (not separately shown); (iv) once the execution is successfully completed by the resource, and control returned to work manager thread pool 204 (also referred to as the "container"), back from the resource, the IOU ticket is returned to the container; (v) the priority is determined based on the number of tickets consumed; (vi) in this embodiment, slowest resource 210, 220 or 230 would be the resource that is holding the most IOU tickets (because when requests take a longer time to return from a resource then that resource will tend to have a greater number of IOU tickets); (vii) during normal operations (also called "runtime"), the identity of the slowest resource(s) may change; (viii) when fastest-to-slowest ranking of the resources 220, 230, 210 changes (based on changes in how many IOU each resource holds) then there will generally be a change in priority order in assigning work manager threads of container 204.

Clustering work manager threads will now be discussed in more detail. Every request to access a different resource 220, 230, 210 will be identified with application components mapped to resources as part of a resource reference in web.xml. During bootstrap of the application, or first access of the application component each application component is provided with an identification code (or "ID") based on the identity of the resource 210,220,230 required by that application component. Requests to the application are then assigned work manager threads based on the availability of IOU tickets for the associated ID. The clustering of the requests into cluster set 202 helps to prioritize the work manager threads of container 204.

The setting of dynamic priority for clustered work threads of container 204 (also called the "container") will now be discussed in more detail. The container will assign a number of "I Owe You" (IOU) tickets (or, simply, "tickets") to each clustered group of work manager threads. Each clustered group of work manager threads respectively corresponds to a resource manager. The number of tickets for each cluster is assigned according to the proportion of incoming request for a given resource. For instance, assume that there are: (i) 100 available work manager threads in work manager thread pool 204, and (ii) three resource managers/resources that are accessed through these 100 available work manager threads. Under these assumptions, if the ratio of incoming requests to these resource managers (RM) is approximately 1:1:2 (in this embodiment, this ratio is determined based on manually configured weights) for three resource managers, then: (i) IOU for 1st RM=100/4=25; (ii) IOU for 2nd RM=100/4=25; and (iii) IOU for 3rd RM=100/4*2=50. A default IOU value for each can be implemented as a configurable priority for a resource manager by application deployers.

In the embodiment under discussion, the container deducts one IOU ticket (or, simply "IOU," also sometimes herein called "voucher") from assigned IOU tickets of the clustered group for every request to a corresponding resource manager just before the control is passed to a driver or a "ConnectionFactory." Once the update is done successfully and control is returned back to the application server container, the IOU is returned back to the clustered group.

If a given resource is slow (this can happen for various reasons), the IOUs keep getting decremented and a slow resource will have few, if any, IOUs. The fastest resource will: (i) have highest number of associated IOUs; and (ii) is given highest priority while allocating a work manager thread. If all the IOU count for a resource drops to zero, then the requests to that resource have to wait until a prior request returns and thereby replenishes an IOU so that a new work manager thread can be allocated. As the number of IOUs varies over time according to resource performance, the priority order of the system's resources will vary accordingly, which will effectively, dynamically control the manner in which work manager threads are allocated on an ongoing basis.

Figure 6:
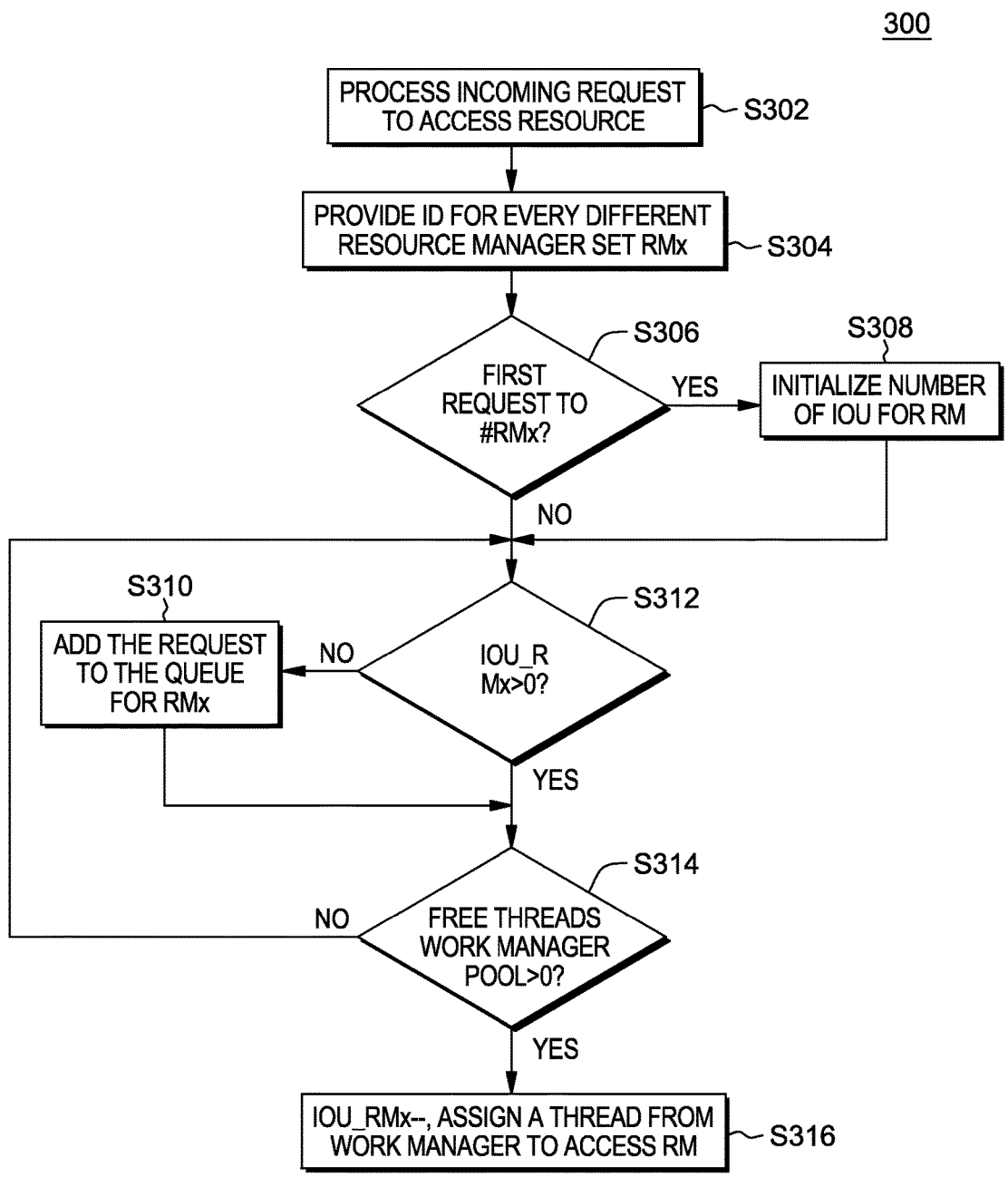
FIG. 6 is a flowchart showing a process performed, at least in part, by the second embodiment computer system.

As shown in FIG. 6, flow chart (or, algorithm) 300 represents an embodiment of an algorithm, according to the present invention, for assigning requests to resource managers and work manager threads with associated IOU recordkeeping. Flow chart 300 includes, with process flow as shown in FIG. 6, the following steps: S302 (receive incoming request for access to a resource); S304 (every resource manager is given a unique identification (ID), in this example RM1, RM2 . . . RMx . . . RMn); S306 (the first request is sent to a given resource manager RMx and it is determined whether this is the first time that RMx has received a request); S308 (if it is the first time that resource manager RMx has had a request addressed to it then the number of IOUs that RMx has (that is, variable IOU_RMx) is initialized; S312 (it is determined whether RMx has more than zero available IOUs; S310 (on condition that RMx has no available IOU the request of step S302 is added to the request queue for RMx); Note: The request is added to the queue for RMx when there are no IOUs available. Later when an IOU becomes available when a thread is returned back to the work manager pool, this request is processed. Thus S310 should not be connected to S314; S314 (it is determined whether there is at least one free thread in the work manager pool); and S316 (on condition that there is a free thread in the work manager pool then: (i) variable IOU_RMx is decremented by one, and (ii) a free work manager thread is assigned to access RMx for purposes of fulfilling the request received at step S302).

Figure 7:
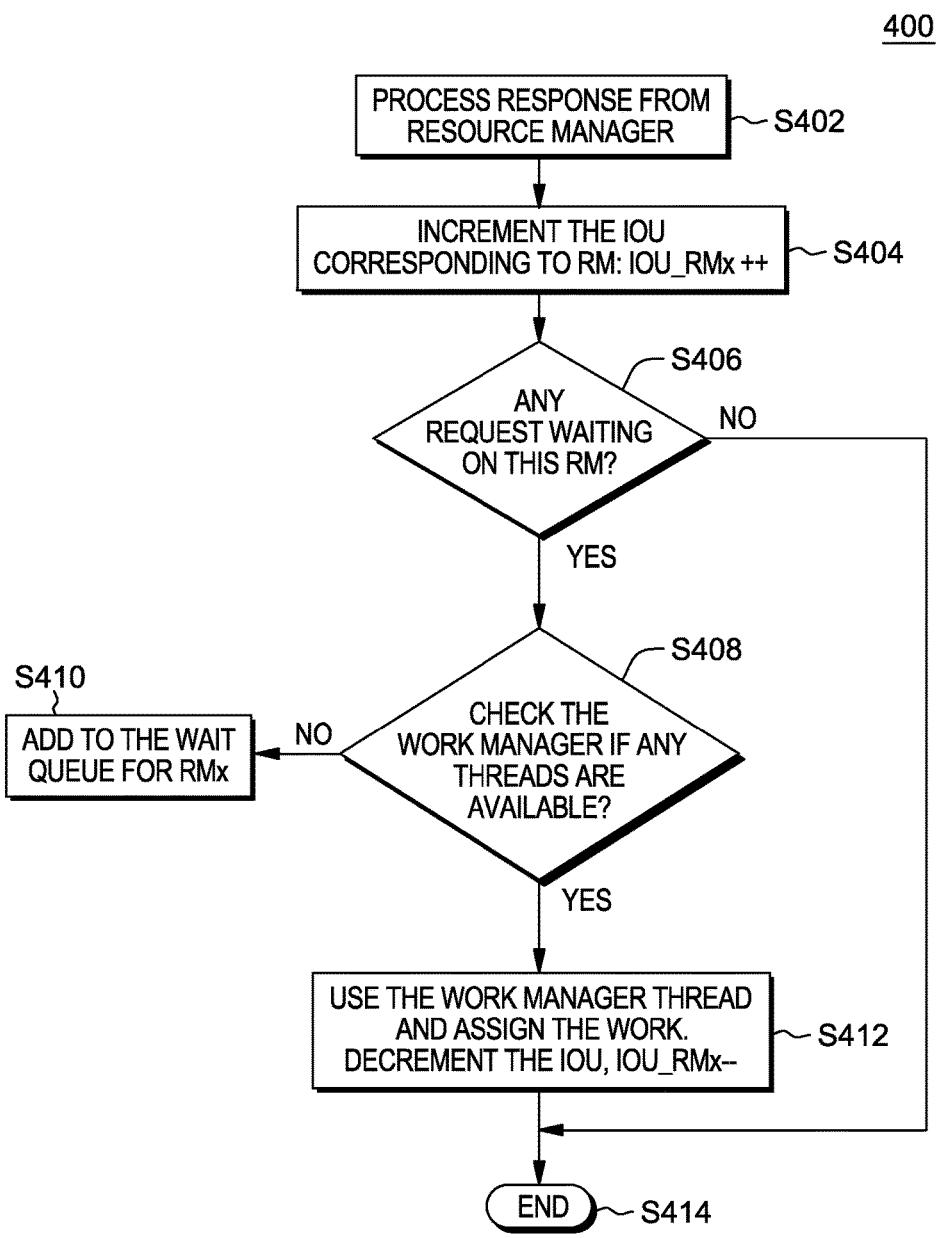
FIG. 7 is a flowchart showing a process performed, at least in part, by the second embodiment computer system.

As shown in FIG. 7, flow chart (or, algorithm) 400 represents an algorithm, according to an embodiment of the present invention, for receiving a request response from a resource manager through a work manager thread and performing associated IOU recordkeeping. Flow chart 400 includes, with process flow as shown in FIG. 7, the following steps: S402 (process request response from resource manager RMx which previously received the request through algorithm 300); S404 (increment RMx); S406 (determine whether any request is currently waiting on RMx; S408 (on condition that a request is waiting on RMx determine whether there are any available work manager threads in the work manager thread pool); S410 (on condition that there are no available work manager threads, add RMx to the resource manager wait queue); S412 (decrement IOU_RMx and assign an available work manager thread for the request results obtained through RMx); and S414 (end).

Some embodiments of the present invention may include one, or more, of the following features, characteristics and/or advantages: (i) optimal usage of work manager threads to serve faster performing resources and non resource access requests; (ii) work manager threads are not "hostage" to a slow Database or slow network performance;

(iii) can also have traditional thread priority manually set on the work manager pool, that will override the clustering of requests according to resources and resource performance based priority setting; (iv) clustering work manager threads based on the thread needs to access as part of work; (v) resource performance based priority to allocate work manager thread; (vi) method and approach of using IOU tickets to measure the performance at runtime, to set priority accordingly and to allocate work manager threads.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A computer program product for optimizing a resource manager thread pool in a production environment, the computer program product comprising:
   one or more non-transitory computer readable storage media and program instructions stored on the one or more non-transitory computer readable storage media, the program instructions comprising:
      first program instructions programmed to divide a set of vouchers into a plurality of voucher subsets so that each voucher subset respectively corresponds to a resource manager of a plurality of resource managers, where each resource manager of the plurality of resource managers respectively corresponds to a resource in an application server and where each voucher subset corresponds respectively to a thread subset associated with the resource and clustered based on the resource;
      second program instructions programmed to receive a plurality of incoming pending requests with each incoming pending request respectively corresponding to a resource;
      third program instructions programmed to temporarily remove a voucher from its voucher subset corresponding to a given resource manager upon each instance that a given pending incoming request is assigned to that given resource manager for responsive processing such that the given pending incoming request thereby becomes an assigned request;
      fourth program instructions programmed to determine which request of the plurality of pending incoming requests will be next assigned to a corresponding resource manager based, at least in part, upon which resource manager has the greatest number of vouchers in its respective subset of vouchers;
      fifth program instructions programmed to assign the plurality of pending incoming requests to a corresponding resource manager for execution by a thread associated with the thread subset; and
      sixth program instructions programmed to return a temporarily removed voucher to its voucher subset corresponding to a given resource manager upon each instance that the given resource manager has completed responsive processing of a given assigned request such that the given assigned request thereby becomes a completed request.

2. The computer program product of claim 1 wherein the software further comprises:
   seventh program instructions programmed to assign a first pending incoming request to a first resource manager of the plurality of resource managers by assigning a first work manager thread to the first pending incoming request such that the first pending incoming request thereby becomes a first assigned request; and
   eighth program instructions programmed to complete the first assigned request by removing the assigned from the first work manager thread such that the first assigned request thereby becomes the first completed request.

3. The computer program product of claim 1 wherein:
the first program instructions are further programmed to divide the set of vouchers into a plurality of voucher subsets based upon an expected ratio between respective numbers of expected pending incoming requests that respectively correspond to each resource of the plurality of resources.

4. The computer program product of claim 1 wherein:
the fourth program instructions are further programmed to determine which request of the plurality of pending incoming requests will be next assigned to a corresponding resource manager by selecting a pending incoming request that is the earliest received request corresponding to a resource manager with the greatest number of vouchers in its corresponding voucher subset.

5. A computer system for optimizing a resource manager thread pool in a production environment, the computer system comprising:
   a processor(s) set; and
   a software storage device;
   wherein:

the processor set is structured, located, connected and/or programmed to run software stored on the software storage device; and the software comprises:
- first program instructions programmed to divide a set of vouchers into a plurality of voucher subsets so that each voucher subset respectively corresponds to a resource manager of a plurality of resource managers, where each resource manager of the plurality of resource managers respectively corresponds to a resource in an application server and where each voucher subset corresponds respectively to a thread subset associated with the resource and clustered based on the resource;
- second program instructions programmed to receive a plurality of incoming pending requests with each incoming pending request respectively corresponding to a resource;
- third program instructions programmed to temporarily remove a voucher from its voucher subset corresponding to a given resource manager upon each instance that a given pending incoming request is assigned to that given resource manager for responsive processing such that the given pending incoming request thereby becomes an assigned request;
- fourth program instructions programmed to determine which request of the plurality of pending incoming requests will be next assigned to a corresponding resource manager based, at least in part, upon which resource manager has the greatest number of vouchers in its respective subset of vouchers;
- fifth program instructions programmed to assign the plurality of pending incoming requests to a corresponding resource manager for execution by a thread associated with the thread subset; and
- sixth program instructions programmed to return a temporarily removed voucher to its voucher subset corresponding to a given resource manager upon each instance that the given resource manager has completed responsive processing of a given assigned request such that the given assigned request thereby becomes a completed request.

6. The system of claim 5 wherein the software further comprises:
- seventh program instructions programmed to assign a first pending incoming request to a first resource manager of the plurality of resource managers by assigning a first work manager thread to the first pending incoming request such that the first pending incoming request thereby becomes a first assigned request; and
- eighth program instructions programmed to complete the first assigned request by removing the assigned from the first work manager thread such that the first assigned request thereby becomes the first completed request.

7. The system of claim 5 wherein:
the first program instructions are further programmed to divide the set of vouchers into a plurality of voucher subsets based upon an expected ratio between respective numbers of expected pending incoming requests that respectively correspond to each resource of the plurality of resources.

8. The system of claim 5 wherein:
the fourth program instructions are further programmed to determine which request of the plurality of pending incoming requests will be next assigned to a corresponding resource manager by selecting a pending incoming request that is the earliest received request corresponding to a resource manager with the greatest number of vouchers in its corresponding voucher subset.

9. A system comprising:
a processor; and
a memory having program instructions embodied therewith, the program instructions configured, when executed by the processor, to cause the processor to perform a method comprising:
- dividing, by one or more processors, a set of vouchers into a plurality of voucher subsets so that each voucher subset respectively corresponds to a resource manager of a plurality of resource managers, where each resource manager of the plurality of resource managers respectively corresponds to a resource in an application server of a plurality of application servers connected by a network and where each voucher subset corresponds respectively to a thread subset associated with the resource and clustered based on the resource;
- receiving, by the one or more processors, a plurality of incoming pending requests with each incoming pending request respectively corresponding to a resource wherein the plurality of incoming pending requests come from the plurality of application servers;
- temporarily removing, by the one or more processors, a voucher from its voucher subset corresponding to a given resource manager upon each instance that a given pending incoming request is assigned to that given resource manager for responsive processing such that the given pending incoming request thereby becomes an assigned request;
- determining, by the one or more processors, which request of the plurality of pending incoming requests will be next assigned to a corresponding resource manager based, at least in part, upon which resource manager has the greatest number of vouchers in its respective subset of vouchers;
- assigning, by the one or more processors, the plurality of pending incoming requests to a corresponding resource manager for execution by a thread associated with the thread subset and
- returning, by the one or more processors, a temporarily removed voucher to its voucher subset corresponding to a given resource manager upon each instance that the given resource manager has completed responsive processing of a given assigned request such that the given assigned request thereby becomes a completed request.

* * * * *